US012331889B2

(12) United States Patent
Benistand-Hector et al.

(10) Patent No.: US 12,331,889 B2
(45) Date of Patent: Jun. 17, 2025

(54) INSTALLATION FOR PUMPING CRYOGENIC FLUID AND FILLING STATION COMPRISING SUCH AN INSTALLATION

(71) Applicant: L'Air Liquide, Société Anonyme pour l'Etude et l'Exploitation des Procédés Georges Claude, Paris (FR)

(72) Inventors: Cyril Benistand-Hector, Sassenage (FR); Martin Graser, Metzingen (DE)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 12 days.

(21) Appl. No.: 18/569,915

(22) PCT Filed: May 18, 2022

(86) PCT No.: PCT/EP2022/063391
§ 371 (c)(1),
(2) Date: Dec. 13, 2023

(87) PCT Pub. No.: WO2022/263086
PCT Pub. Date: Dec. 22, 2022

(65) Prior Publication Data

US 2024/0280219 A1 Aug. 22, 2024

(30) Foreign Application Priority Data

Jun. 14, 2021 (FR) ...................................... 2106233

(51) Int. Cl.
*F17C 5/02* (2006.01)

(52) U.S. Cl.
CPC .......... *F17C 5/02* (2013.01); *F17C 2205/018* (2013.01); *F17C 2205/0352* (2013.01);
(Continued)

(58) Field of Classification Search
CPC .................. F17C 5/02; F17C 2205/018; F17C 2205/0352; F17C 2221/012; F17C 2223/0161; F17C 2227/0135
(Continued)

(56) References Cited

U.S. PATENT DOCUMENTS 3,816,036 A * 6/1974 Rogers ................ F04B 39/0027
417/536
5,545,015 A 8/1996 Scherrer
(Continued)

FOREIGN PATENT DOCUMENTS

EP 0 628 723 12/1994

OTHER PUBLICATIONS

International Search Report for corresponding PCT/EP2022/063391, Aug. 10, 2022.

*Primary Examiner* — Umashankar Venkatesan
*Assistant Examiner* — Christopher M Afful
(74) *Attorney, Agent, or Firm* — Elwood L. Haynes

(57) ABSTRACT

An installation for pumping cryogenic fluid including a fluidtight enclosure configured to contain a bath of cryogenic fluid, the enclosure housing a compression chamber communicating with the bath and a piston that moves in order to compress the fluid in the compression chamber, the piston being mounted at a first end of a rod, the installation including a drive mechanism driving a second end of the rod) in a back and forth movement in a longitudinal direction of travel, the drive mechanism including a motor equipped with a rotary shaft and a mechanical conversion system converting the rotational movement of the rotary shaft into a translational movement, in the configuration of operation of the installation, the longitudinal direction of travel of the piston rod being vertical, the motor being fixed rigidly to an upper mounting structure.

7 Claims, 2 Drawing Sheets

(52) U.S. Cl.
CPC .................. *F17C 2221/012* (2013.01); *F17C 2223/0161* (2013.01); *F17C 2227/0135* (2013.01)

(58) Field of Classification Search
USPC .......................................................... 141/311
See application file for complete search history.

(56) References Cited

U.S. PATENT DOCUMENTS

| | | | | |
|---|---|---|---|---|
| 5,593,288 | A * | 1/1997 | Kikutani | F04B 53/06 417/466 |
| 2002/0098093 | A1* | 7/2002 | Tomell | F04B 39/0055 417/415 |
| 2011/0232283 | A1 | 9/2011 | Gregory et al. | |
| 2016/0281690 | A1 | 9/2016 | Coldren et al. | |
| 2018/0180035 | A1 | 6/2018 | Popadiuc | |

* cited by examiner

[Fig. 1]
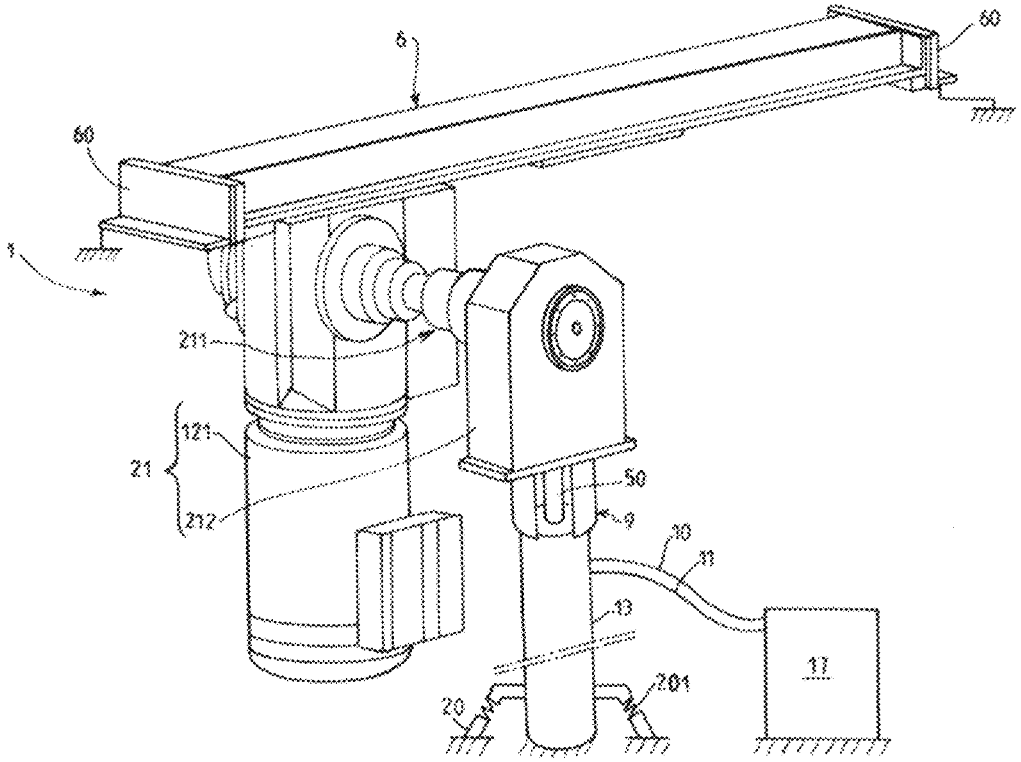

[Fig. 2]
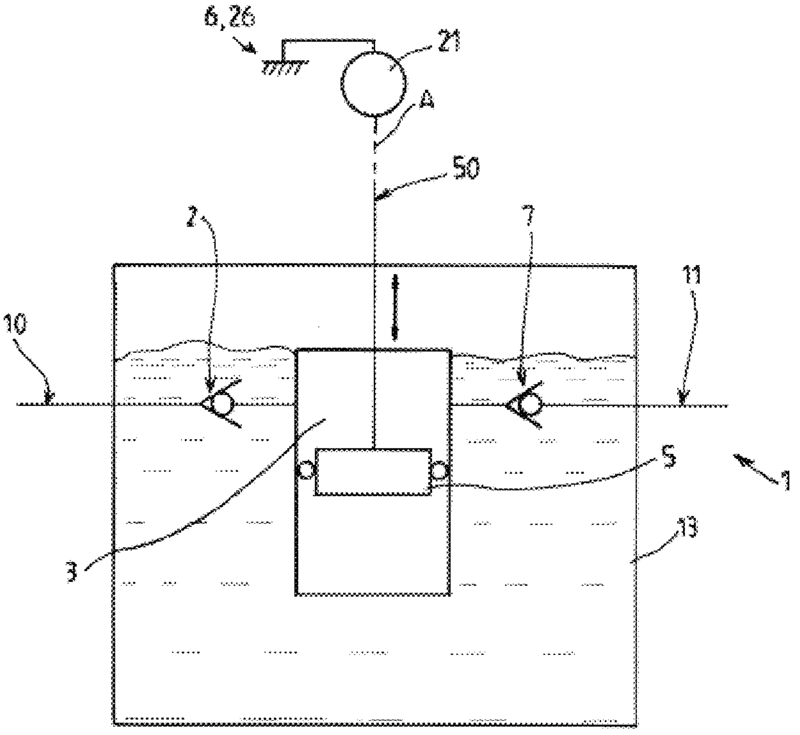
[Fig. 3]
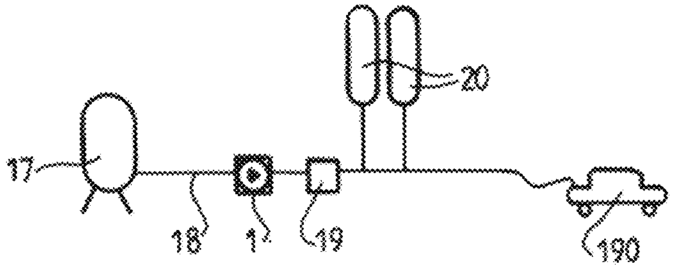

INSTALLATION FOR PUMPING CRYOGENIC FLUID AND FILLING STATION COMPRISING SUCH AN INSTALLATION

CROSS REFERENCE TO RELATED APPLICATIONS

This application is a 371 of International Application No. PCT/EP2022/0623391, filed May 18, 2022, which claims priority to French Patent Application No. 2106233, filed Jun. 14, 2021, the entire contents of which are incorporated herein by reference.

BACKGROUND

The invention relates to an installation for pumping cryogenic fluid, and to a filling station comprising such an installation.

The invention relates more particularly to an installation for pumping cryogenic fluid comprising a fluidtight enclosure intended to contain a bath of cryogenic fluid, the enclosure housing a compression chamber communicating with the bath and a piston that is able to move in order to compress the fluid in the compression chamber, the piston being mounted at a first end of a rod, the apparatus comprising a drive mechanism driving a second end of the rod in a back and forth movement in a longitudinal direction of travel, the drive mechanism comprising a motor equipped with a rotary shaft and a mechanical conversion system converting the rotational movement of the rotary shaft into a translational movement, in the configuration of operation of the installation, the longitudinal direction of travel of the piston rod being vertical, the motor being fixed rigidly to an upper mounting structure, the rotary shaft being coupled to the mechanical conversion system via a connecting system such as a rigid connection or a Cardan joint.

A conventional solution for actuating a reciprocating piston pump uses a motor and a mechanical conversion system (connecting rod/crank and/or reduction gear and/or gearbox system) to convert the movement of the rotary shaft of the motor into a translational movement.

The majority of known cryogenic pumps operate with the piston axis horizontal. This can be done with a vacuum insulated cold end.

In hydrogen refuelling stations, the pump needs to be available for pumping 24-hours a day. It is therefore preferable for the cold end to be placed in a vacuum insulated bath (Dewar vessel) of cryogenic liquid (sump), to ensure that it remains cold. In such instances, it is more appropriate for the piston to be oriented vertically.

In such a case, certain adaptations are needed in order to optimally support the pump and the drive actuator (motor and associated mechanism). A Cardan system may be employed to transmit the torque from the rotation output of the gearbox of the motor to the crank of the mechanical unit that converts the rotational movement supplied by the motor into a reciprocating translational movement of the piston rod. This allows for optimal mounting without demanding overly close tolerances.

However, in this configuration, a torque is transferred through the axle of the Cardan to the mechanism that converts the rotational movement into a translational one. There is effectively no satisfactory counter-torque system. The casing of the mechanism needs to withstand this torque. The torque will thus be transferred through the entire pumping structure. This is unacceptable particularly as regards the mechanical strength of the tank containing the bath and the overall strength of the structure.

Even if these elements were dimensioned accordingly, there would still be risks with regard to the potential problems of vibration and fatigue.

With a hydraulic solution, it is relatively easy to position the pump vertically because the hydraulic ram is relatively small. The enormous supply unit may itself be relocated several meters away. However, the overall layout and effectiveness are not well suited to the application.

A solution involving a linear actuator with a roller screw is also easy to implement on account of its compactness. However, this solution is not well suited to high-pressure cryogenic applications because of its poor efficiency and reliability. An aim of the present invention is to overcome all or some of the prior-art drawbacks outlined above.

SUMMARY

To this end, the installation according to the invention, in other respects in accordance with the generic definition thereof given in the above preamble, is essentially characterized in that an upper first end of the enclosure is connected to the mechanical conversion system, a lower second end of the enclosure bears against a support that holds it in place and absorbs forces transmitted by the motor via the shaft.

Furthermore, embodiments of the invention may comprise one or more of the following features:

- the lower second end of the enclosure comes to bear in a housing on the ground ensuring that it is held in a direction transverse to the longitudinal direction,
- the installation comprises one or more legs connecting the enclosure to the ground or a support on the ground,
- the installation comprises a flexible and/or adjustable connection connecting the enclosure to the ground, the installation comprises a tank of liquefied gas, notably of hydrogen, said tank being fluidically connected by a set of pipes to the enclosure, these pipes being configured to supply the compression chamber with fluid that is to be compressed,
- the mechanical conversion system to convert the rotational movement of the rotary shaft into a translational movement of the piston rod is of the connecting rod/crank type,
- the motor is housed in a casing fixed to the upper mounting structure,
- the installation it is of the type having one compression stage, which is to say that the fluid is compressed just once, between an inlet system and a discharge system in the compression chamber,
- the installation is of the type having two compression stages, which is to say that the fluid is compressed twice, between an inlet system and a discharge system, the installation comprising two compression chambers, an inlet system communicating with a first compression chamber, a transfer system for communicating with the first and second compression chamber and configured to allow fluid compressed in the first compression chamber to be transferred to the second compression chamber, the mobile piston alternately compressing the fluid in the first and second compression chambers depending on the direction in which it is travelling, and a discharge system communicating with the second compression chamber, the compression of the fluid in the compression chamber is brought about by a pulling or a compressing of the rod.

The invention also relates to a station for filling tanks or pipes with pressurized gas and comprising a source of liquefied gas, notably a tank of liquefied hydrogen, a withdrawal circuit having a first end connected to the source and at least one second end intended to be connected to a tank to be filled, the withdrawal circuit comprising a pumping installation according to any one of the features above or below.

The invention may also relate to any alternative device or method comprising any combination of the features above or below within the scope of the claims.

BRIEF DESCRIPTION OF THE DRAWINGS

Further particular features and advantages will become apparent from reading the following description, which is given with reference to the figures, in which:

FIG. 1 shows a schematic and partial perspective view illustrating a possible embodiment of a pumping installation according to the invention, FIG. 2 shows a schematic and partial view in cross section illustrating a detail of the installation and in particular an example of the structure of a compression chamber, FIG. 3 shows a schematic and partial view illustrating an example of a filling station using such a compression apparatus.

DETAILED DESCRIPTION OF PREFERRED EMBODIMENTS

The installation 1 depicted for pumping cryogenic fluid comprises a fluidtight enclosure 13 intended to contain a bath of cryogenic fluid. The enclosure 13 may be vacuum thermally insulated and houses a compression chamber 3 that communicates with the bath and a mobile piston 5 able to move in order to compress the fluid in the compression chamber 3, see FIG. 2.

The piston 5 is mounted at a first end of a piston rod 50. The apparatus 1 comprises a drive mechanism 21 for driving a second end of the rod 50 in a back and forth motion in a longitudinal direction A of travel.

The drive mechanism 21 comprises a motor 121 (with a gearbox or the like where appropriate) equipped with a rotary shaft 211 and a mechanical conversion system 212 that converts the rotational movement of the rotary shaft 211 into a translational movement of the rod 50. The mechanical conversion system 212 to convert the rotational movement of the rotary shaft 211 into a translational movement of the piston rod 50 may be of the connecting rod/crank type, and is housed inside a casing.

The rotary shaft 211 of the motor 121 is coupled to the mechanical conversion system 212 via an axle comprising a connecting system such as a rigid connection or a Cardan joint, for example.

A coupling involving a Cardan joint may allow greater tolerances on assembly.

The Cardan-joint coupling between the two entities also makes it possible for the "useful" torque to be transferred optimally with relative ease of maintenance.

These elements (motor 121 and mechanical conversion system 212) may be housed in respective casings.

The movement conversion system 212 (and its casing) may easily be removed in order to access the cold end positioned vertically beneath the mechanism (below a crankshaft notably in the case of a connecting-rod/crank mechanism).

As illustrated, when the installation 1 is in an operating configuration, the longitudinal direction A of travel of the piston rod 50 is vertical. The motor 121 is fixed rigidly to an upper mounting structure 6 comprising, for example, a horizontal beam.

The axle of the motor may be non-colinear with the axis of the piston rod 9. For example, the axle of the motor forms an angle with the piston rod 50, for example is perpendicular thereto. That is to say that the transmission turns through a right-angle between the axle of the motor and the piston rod 50 which right-angle is ensured by the mechanical conversion system 212.

The motor 121 and the conversion system 212 are arranged above the enclosure.

The motor 121 is rigidly connected to the upper mounting structure which absorbs the forces of the motor, while the enclosure 13 absorbs the forces (in another direction) transmitted by the mechanical conversion system 212.

The motor 121 may notably be suspended from its upper mounting structure 6.

The upper mounting structure for the motor 121 may comprise a first assembly of horizontal support beam(s) 6, these beams being connected to a load-bearing structure 60 comprising vertical legs resting on the ground.

An upper first end of the enclosure 13 is connected to the mechanical conversion system 212, a lower second end of the enclosure 13 itself resting on a support which holds it in place and absorbs forces transmitted by the motor 121 via the shaft 211.

The lower second end of the enclosure 13 may for example bear in a housing on the ground ensuring that it is held in a direction transverse to the longitudinal direction A.

As illustrated, the installation 1 may comprise one or more legs 20 connecting the enclosure 13 to the ground or to a support on the ground.

For example, a flexible and/or adjustable connection 201 may be provided for connecting the enclosure 13 to the ground (for example at the leg 20).

This arrangement with the enclosure resting on a support (the ground or some other) allows the structure to absorb and/or spread the forces and/or the torque transmitted by the motor 121 via the axle 211.

The mechanical conversion system 212 may thus be both connected to the motor 121 via the axle 211, and rest on the ground via the vessel 13 which is attached to it in the lower part.

In the example illustrated, the installation 1 comprises a tank 17 of liquefied gas, notably of hydrogen. The tank 17 is fluidically connected to the enclosure 13 by a set of pipes 10, 11, and these pipes are configured to supply the compression chamber 3 with fluid that is to be compressed and to recover any boil-off gas that has been created, notably in the enclosure 13.

This tank 17 may rest on the ground. The pipes 10, 11 may comprise flexible portions.

Specifically, as described in greater detail hereinafter, the cryogenic pipes connecting this vessel 13 and a tank 17 of cryogenic liquid may be flexible pipes so as to absorb thermal contractions and tolerate minor misalignments.

The structure of the installation offers a number of advantages.

Aside from transmitting motion between the motor 121 and the axle 50 without unwanted torque, the structure is particularly well suited to ease of maintenance (for example by the removal of a vertically-arranged element, notably a casing, in order to access the mechanism(s)).

The drive mechanism (motor+possibly reduction gear or gearbox) does not need to be removed during maintenance of the cold side of the cryogenic pumping part. The frequency of maintenance of the motor part 121 is actually generally lower than for the cold drive part. The proposed structure allows the cold part 212 to be accessed without removing the motor part 121 (visual inspection, cleaning, replacement of seals, lubrication, etc.).

The installation 1 is compact and positioned low to the ground. This is well suited to its integration into a filling station.

The motor 121 and the associated reduction gear may be standard elements, notably with an explosion-proof structure or enhanced safety.

The motor 121 and the conversion system 212 may be positioned in various relative configurations, notably horizontally, vertically, with the shaft 211 rotating in or perpendicular to this axis depending on the model of reduction-gear system 212 used (helical gear, helical bevel gear, worm gear, helical parallel shaft, right-angle reducer).

The assembly comprising the motor 121 and its reducer, if any, illustrated and from which the rotary axle 211 projects may, where applicable, advantageously be replaced by a torque motor (which therefore has no reduction gearbox or gearbox). In such an instance, there is no problem with oil due to lubrication. In addition, in such an instance, the assembly is more compact and lighter in weight. In addition, such a motor assembly offers greater flexibility in the setting of the speed (speed, and notably rotational-speed, profile).

FIG. 2 schematically illustrates an example of a compression chamber (single compression stage) with an intake system 2 communicating with the compression chamber 3 and configured to allow fluid that is to be compressed to enter the compression chamber 3, a piston 5 able to move in order to compress the fluid in the compression chamber 3, and a discharge system 7 communicating with the compression chamber 3 and configured to allow the compressed fluid to exit. The compression of the fluid in the compression chamber may be brought about by a pulling or a compressing of the rod 50.

Of course, the invention also applies to pumps having two compression stages (for example, two compression chambers and two compression stages each for a respective one of the two directions of translational movement of the piston).

FIG. 3 depicts an example of a station for filling tanks or pipes with pressurized gas and comprising a source 17 of liquefied gas, notably liquefied hydrogen, a withdrawal circuit 18 having a first end connected to the source and at least one second end intended to be connected to a tank 190 to be filled. The withdrawal circuit 18 comprising a compression apparatus 1 conforms to the installation in accordance with any one of the above features.

The structure of the installation offers a number of advantages.

Aside from transmitting motion between the motor 121 and the axle 50 without unwanted torque, the structure is particularly well suited to ease of maintenance (for example by the removal of a suspended element, notably a casing, in order to access the mechanism(s)).

The installation 1 is compact and positioned low to the ground. This is well suited to its integration into a filling station.

The motor 121 and the associated reduction gear may be standard elements, notably with an explosion-proof structure.

The motor 121 and the conversion system 212 may be positioned in various relative configurations, notably horizontally, vertically, with the shaft 211 rotating in or perpendicular to this axis depending on the model of known reduction-gear system 212 (helical gear, helical bevel gear, worm gear, helical parallel shaft, right-angle reducer).

The assembly comprising the motor 121 and its reducer, if any, illustrated and from which the rotary axle 211 projects may, where applicable, advantageously be replaced by a torque motor (which therefore has no reduction gearbox or gearbox). In such an instance, there is no problem with oil due to lubrication. In addition, in such an instance, the assembly is more compact and lighter in weight. In addition, such a motor assembly offers greater flexibility in the setting of the speed (speed, and notably rotational-speed, profile).

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. An installation for pumping cryogenic fluid comprising a fluidtight enclosure configured to contain a bath of cryogenic fluid, the enclosure housing a compression chamber communicating with the bath and a piston that moves in order to compress the fluid in the compression chamber, the piston being mounted at a first end of a rod, the installation comprising a drive mechanism driving a second end of the rod in a back and forth movement in a longitudinal direction of travel, the drive mechanism comprising a motor equipped with a rotary shaft and a mechanical conversion system converting the rotational movement of the rotary shaft into a translational movement, in the configuration of operation of the installation, the longitudinal direction of travel of the piston rod being vertical, the motor being fixed rigidly to an upper mounting structure the rotary shaft being coupled to the mechanical conversion system via a connecting system such as a rigid connection or a Cardan joint, an upper first end of the enclosure being connected to the mechanical conversion system, a lower second end of the enclosure bearing against a support that holds it in place and absorbs forces transmitted by the motor via the shaft, the motor being suspended from the upper mounting structure, the motor and the mechanical conversion system being arranged horizontally with the rotary shaft in the horizontal axis.

2. The installation as claimed in claim 1, wherein the mechanical conversion system is of the connecting rod/crank type.

3. The installation as claimed in claim 1, wherein the lower second end of the enclosure comes to bear in a housing on the ground ensuring that it is held in a direction transverse to the longitudinal direction.

4. The installation as claimed in claim 1, further comprising one or more legs connecting the enclosure to the ground or a support on the ground.

5. The installation as claimed in claim 1, further comprising a flexible and/or adjustable connection connecting the enclosure to the ground.

6. The installation as claimed in claim 1, further comprising a tank of liquefied gas, said tank being fluidically connected by a set of pipes to the enclosure, the pipes being configured to supply the compression chamber with fluid that is to be compressed.

7. A station for filling tanks or pipes with pressurized gas and comprising a source of liquefied gas, a withdrawal circuit having a first end connected to the source and at least one second end configured to be connected to a tank to be filled, the withdrawal circuit comprising an installation as claimed in claim 1.

* * * * *